United States Patent
Guo (10) Patent No.: US 7,088,989 B2
(45) Date of Patent: Aug. 8, 2006

(54) MOBILE USER LOCATION PRIVACY SOLUTION BASED ON THE USE OF MULTIPLE IDENTITIES

(75) Inventor: Yile Guo, Woburn, MA (US)

(73) Assignee: Nokia Corporation, Espoo (FI)

( * ) Notice: Subject to any disclaimer, the term of this patent is extended or adjusted under 35 U.S.C. 154(b) by 138 days.

(21) Appl. No.: 10/431,283

(22) Filed: May 7, 2003

(65) Prior Publication Data

US 2004/0224664 A1  Nov. 11, 2004

(51) Int. Cl.
*H04M 1/66* (2006.01)
*H04Q 7/20* (2006.01)
*G01C 21/26* (2006.01)
*H04B 7/185* (2006.01)

(52) U.S. Cl. .................. 455/411; 455/456.1; 701/213; 342/357.1

(58) Field of Classification Search ............... 340/5.25, 340/5.61; 707/1; 370/449; 713/200, 193, 713/201, 171; 455/456.1, 426, 433, 436, 455/434, 456, 457, 413, 411, 404.2, 435; 701/213; 342/357.09, 357.14, 357.1, 357.9; 705/18; 726/3

See application file for complete search history.

(56) References Cited

U.S. PATENT DOCUMENTS

| | | | |
|---|---|---|---|
| 5,345,506 A * | 9/1994 | Tsubakiyama et al. | 713/171 |
| 6,091,945 A * | 7/2000 | Oka | 455/411 |
| 6,223,290 B1 * | 4/2001 | Larsen et al. | 726/3 |
| 6,304,753 B1 * | 10/2001 | Hartmaier | 455/413 |
| 6,360,102 B1 * | 3/2002 | Havinis et al. | 455/457 |
| 6,370,380 B1 * | 4/2002 | Norefors et al. | 455/436 |
| 6,373,946 B1 * | 4/2002 | Johnston | 380/211 |
| 6,417,801 B1 | 7/2002 | van Diggelen | 342/357.08 |
| 6,453,237 B1 | 9/2002 | Fuchs et al. | 701/213 |
| 6,463,534 B1 | 10/2002 | Geiger et al. | 713/168 |
| 6,473,032 B1 * | 10/2002 | Trimble | 342/357.14 |
| 6,501,949 B1 * | 12/2002 | Singleton | 455/422.1 |
| 6,510,387 B1 * | 1/2003 | Fuchs et al. | 701/213 |
| 6,516,197 B1 * | 2/2003 | Havinis et al. | 455/456.1 |
| 6,618,005 B1 * | 9/2003 | Hannah et al. | 342/357.1 |
| 6,735,442 B1 * | 5/2004 | Tu et al. | 455/434 |
| 2002/0029342 A1 * | 3/2002 | Keech | 713/184 |

(Continued)

FOREIGN PATENT DOCUMENTS

KR   WO 01/99334 A1 *  12/2001

OTHER PUBLICATIONS

3GPP TS 23.003, "Third Generation Partnership Project; Technical Specification Group Core Network; Numbering, addressing and identification (Release 5)" 39 pages.

*Primary Examiner*—George Eng
*Assistant Examiner*—Kiet Doan
(74) *Attorney, Agent, or Firm*—Harrington & Smith, LLP (57) ABSTRACT

A mobile device (10) includes a wireless network adapter (13) for communication with a wireless access network (24), and further includes a memory (23) in the mobile device for securely storing at least one pseudo-identification (IDp) of a mobile device user in conjunction with an actual identification (ID1) of the mobile device user. The mobile device further includes a mobile device identity manager (22), coupled to the memory, for transmitting ID1 from the mobile device to a trusted wireless access network for associating ID1 with a location of the mobile device (12), and for transmitting IDp from the mobile device to an untrusted wireless access network for associating IDp with a location of the mobile device (18).

20 Claims, 5 Drawing Sheets

U.S. PATENT DOCUMENTS

| | | |
|---|---|---|
| 2002/0049537 A1* | 4/2002 | Dooley et al. .............. 701/213 |
| 2002/0090957 A1* | 7/2002 | Harris ....................... 455/456 |
| 2002/0147917 A1* | 10/2002 | Brickell ...................... 713/193 |
| 2002/0172218 A1* | 11/2002 | Harrison .................... 370/449 |
| 2002/0177433 A1* | 11/2002 | Bravo et al. ................ 455/411 |
| 2003/0014315 A1* | 1/2003 | Jaalinoja et al. ............. 705/18 |
| 2003/0050918 A1* | 3/2003 | Pilkington et al. ............ 707/1 |
| 2003/0069694 A1* | 4/2003 | Fuchs et al. ................ 701/213 |
| 2003/0078053 A1* | 4/2003 | Abtin et al. ................ 455/456 |
| 2003/0104819 A1* | 6/2003 | Knauerhase et al. ........ 455/456 |
| 2003/0114157 A1* | 6/2003 | Spitz et al. ................. 455/435 |
| 2003/0151493 A1* | 8/2003 | Straumann et al. ........ 340/5.25 |
| 2003/0154025 A1* | 8/2003 | Fuchs et al. ................ 701/213 |
| 2003/0177381 A1* | 9/2003 | Ofek et al. ................. 713/200 |
| 2004/0008138 A1* | 1/2004 | Hockley et al. ....... 342/357.09 |
| 2004/0123153 A1* | 6/2004 | Wright et al. ............... 713/201 |
| 2004/0203853 A1* | 10/2004 | Sheynblat ................ 455/456.1 |
| 2004/0203915 A1* | 10/2004 | van Diggelen et al. .. 455/456.1 |

* cited by examiner

MOBILE USER LOCATION PRIVACY SOLUTION BASED ON THE USE OF MULTIPLE IDENTITIES

TECHNICAL FIELD

This invention relates generally to wireless communication systems that include mobile communication elements and, more specifically, relates to location services for use in determining a location of a mobile communication element.

BACKGROUND

A location service architecture in advanced mobile communication networks, e.g., second generation (2G), 2.5G and 3G mobile networks such as those known as the Global System for Mobile Communication, General Packet Radio System and Universal Mobile Telecommunications System (GSM/GPRS/UMTS) networks, is currently being defined and developed. However, the effort to define the location service architecture in the wireless local area network (WLAN) area is just beginning.

A problem that can be foreseen is that an unsecured location service system is vulnerable to unauthorized access to obtain a mobile user's location information. The Internet Protocol (IP) addresses of a mobile terminal, and its current attached wireless access network, can reveal a considerable amount of location information about the mobile terminal. In addition, an unencrypted and clear transmission of a mobile user's naming information exposes the identity of the mobile user to the outside world. Any or all of these factors may cause the location information of a mobile user to become available to unauthorized parties.

While many mobile users appreciate the convenience and the inherent value of location-based services (e.g., emergency rescue, child monitoring, etc.), a concern exists that their location information may be subject to unauthorized access and possibly undesirable exploitation. It is therefore important to define and develop end-to-end, comprehensive solutions to protect the privacy of the mobile user's location information.

There are several location privacy threats. In general, the location privacy problem can be viewed requiring an identification of what mechanisms can reveal the mobile user's location information. The identity disclosure mechanisms can include the mobile user's IP routing information, an unsecured location service system, the mobile user's location-based service provider, the user's mobile operator location server and the presence of the mobile user's identity on the network.

Of the foregoing location disclosure mechanisms, the mobile user's identity protection is of the most concern to the teachings of this invention.

In the existing location service-based techniques it is assumed that the location server in the wireless access network can always be trusted. Therefore, the full identity information of the mobile user is presented to the location server.

While in some wireless networks (such as UMTS) the location server is trusted, there are an increasing number of wireless access networks (e.g., hot spot wireless LAN) in which the location server is "non-trusted", and the combined identity information and location information in the non-trusted location server may be revealed to the other parties without mobile user's consent. Such disclosure may be done by the non-trusted location server, or by other parties having unauthorized access to data stored in the location server.

In the hot spot wireless networks in particular it is quite easy for the location server to have knowledge of the location information of the mobile device. For example, the mere fact that the mobile device is connected to an access point is sufficient to pinpoint its location quite accurately, due to the knowledge of the location of the access point and the short range of such connections.

A prior art approach, known as a Temporary Mobile Subscriber Identity (TMSI) in GSM/UMTS, was designed for wireless networks having a trusted location server, and thus offer no protection for the mobile user's location privacy when connecting to a wireless access network having a non-trusted location server. The TMSI only protects the mobile user's identity on the air link between the mobile terminal and the location server. The location server in GSM/UMTS is assumed, however, to be trusted, and has the knowledge of the actual identity of the mobile user (in the form of the International Mobile Subscriber Identity, or IMSI). Thus, the use of the TMSI in GSM/UMTS does not protect the mobile user's location privacy from the non-trusted location server.

A publication that describes the TMSI is: 3GPP TS 23.003, "Third Generation Partnership Project; Technical Specification Group Core Network; Numbering, addressing and identification (Release 5)", www.3gpp.org.

Prior to this invention, no satisfactory solution existed for adequately protecting the privacy of the mobile user's network identity and, hence, the mobile user's location information.

SUMMARY OF THE PREFERRED EMBODIMENTS

The foregoing and other problems are overcome, and other advantages are realized, in accordance with the presently preferred embodiments of these teachings.

A mobile device includes a wireless network adapter for communication with a wireless access network, and further includes a memory in the mobile device for securely storing at least one pseudo-identification (IDp) of a mobile device user in conjunction with an actual identification (ID1) of the mobile device user. The mobile device further includes a mobile device identity manager, coupled to the memory, for transmitting ID1 from the mobile device to a trusted wireless access network for associating ID1 with a location of the mobile device, and for transmitting IDp from the mobile device to an untrusted wireless access network for associating IDp with a location of the mobile device.

A method of this invention includes storing in a mobile device an actual identification (ID1) of a mobile device user; when registering with a non-trusted wireless access network, one of generating a pseudo-identification (IDp) or accessing a stored IDp; transmitting IDp from the mobile device to an authentication module of the non-trusted wireless access network; authenticating the mobile device user based on IDp; and providing a location of the mobile device and IDp to an application.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
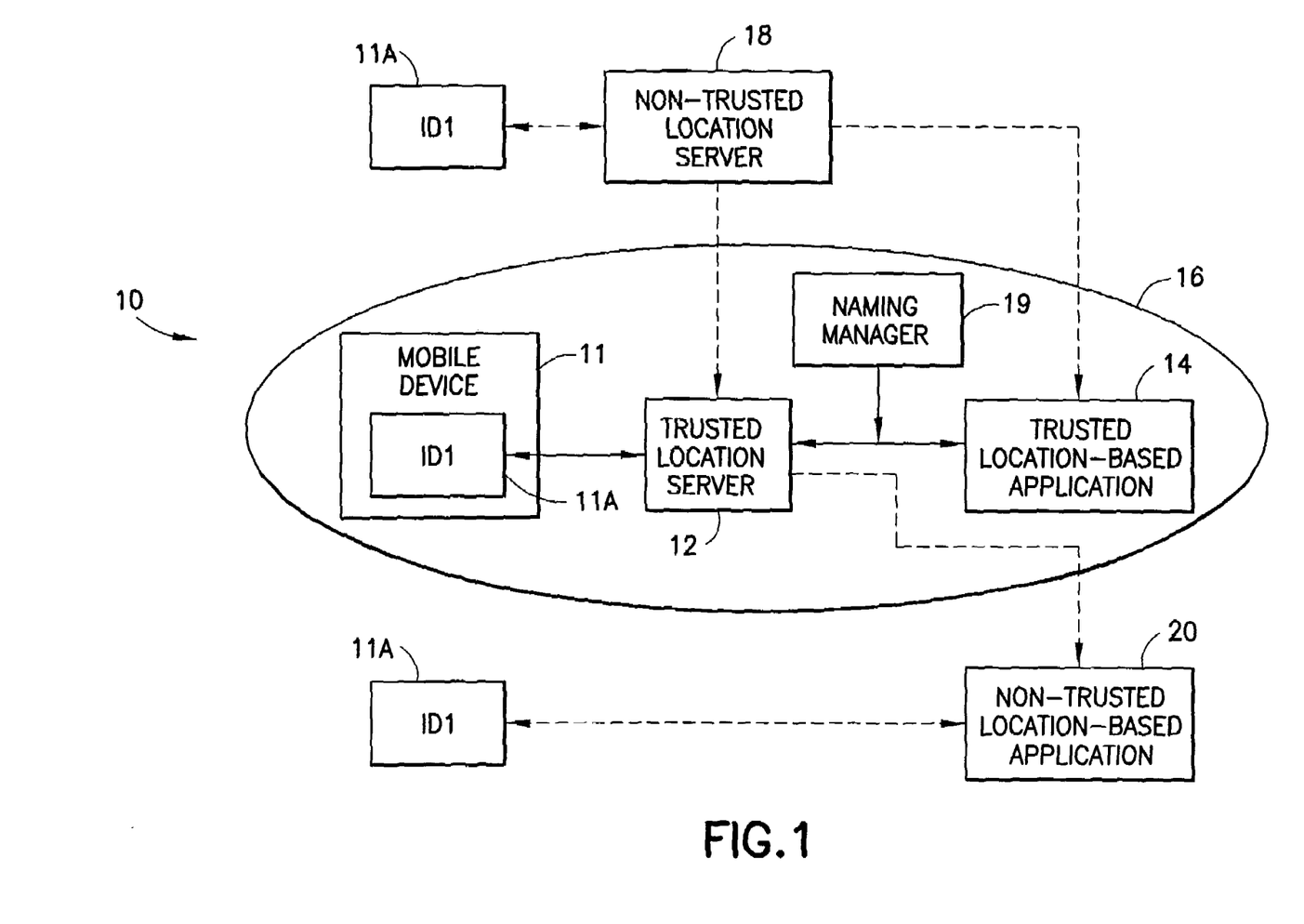
FIG. 1 shows a block diagram that represents a model for a location service architecture involving both trusted and non-trusted location server and location-based applications.

In order to gain a better appreciation of this invention, reference is made first to FIG. 1 for showing a framework model useful for describing a basic location service architecture. An important feature of the model is the assumed presence of a trusted relationship between a mobile user having a mobile device 11, location server(s) 12 and location-based application(s) 14. These exist within a trusted environment 16, and may be referred to for convenience as an "all-trusted model" 10.

In the all-trusted model 10 there exists at least one trusted location server 12 and at least one trusted location-based application 14 that exist within the trusted environment 16. The "trusted" entities are assumed to be trusted relative to a mobile user associated with the mobile device 11, and might be considered to be "untrusted" relative to some other mobile device user. The mobile device 11 includes a mobile user identification (ID1) 11A that can be stored in a non-volatile memory of the mobile device 11. The mobile user identification (ID1) can take a number of forms, such as the name of the mobile user, or the user's telephone number, and or suitable form for identifying the mobile user relative to the other mobile users that exist.

Outside of the trusted environment 16, i.e., outside of the "all-trusted model" 10, there can be assumed to be at least one non-trusted location server 18 and at least one non-trusted location-based application 20.

Shown for completeness in FIG. 1 is a Naming Manager 19 that is responsible for assigning and managing the names in the network.

The mobile device 11, the location server 12 and the location-based application 14 are all trusted entities to the mobile user. The trusted mobile device 11 contains, in addition to the mobile user's identity information 11A (e.g., stored in non-volatile memory), a network address, such as an IP address, and an identification of mobile device 11 (such as a serial number or the IMEI (International Mobile Station Equipment Identity). The trusted location server (TLS) 12 collects location information for the mobile device 11, using one or more location technologies (e.g., cell id, GPS, etc.). The TLS 12 also has knowledge of the full identity information of the mobile user. The trusted location-based application(s) (TLA) 14 requests the mobile user's location information from the TLS 12, and the TLS 12 sends the location information, along with the mobile user ID1, to the TLA 14. The identity information and location information must be delivered securely (with data integrity and data confidentiality) between the TLS 12 and TLA 14, and between the mobile device 11 and TLS 12. The TLS 12 and TLA 14 are trusted not to reveal mobile user's identity information 11A, and the mobile user's location information, to other parties without the consent of the mobile user.

The "all-trusted" model 10 may be appropriate for the case in which a single mobile operator/service provider provides the mobile device 11, the network access technology, the TLS 12 and the TLA 14 to the mobile user. However, an ongoing trend in mobile communications suggests that many mobile users will have "multiple everything": i.e., multiple mobile devices; multiple wireless access networks, e.g. GPRS/UMTS, WLAN, etc.; multiple location servers, e.g. 3GPP LCS, WLAN/hot spot location server, etc., as well as the non-trusted location server 18; and multiple location-based applications, both inside (TLA 14) and outside (non-trusted location-based application 20) the mobile user's operator's network domain. As is shown in FIG. 1, the untrusted entities may all have access to the mobile user's identification information 11A.

In such environment, it is very difficult to ensure that all the parties involved are trusted not to reveal mobile user's location information and identity information without the consent of the mobile user. Therefore, the model 10 of location service architecture includes both the trusted and non-trusted parties.

A discussion is now made of the non-trusted location server (NLS) 18. In the model shown in FIG. 1, in addition to the trusted location servers 12, there are non-trusted location servers (NLS) 18. One reason for the presence of the NLS is the proliferation of wireless connectivity, especially short-range wireless connectivity, e.g., in hot spot (WLAN, Bluetooth, etc.) and/or peer-to-peer wireless networks. In such an environment, the simple fact that the mobile device 11 is connected to an access point or other devices via a short-range wireless link immediately reveals the location information, as well as the network address of the mobile device. Such information can be readily collected by the NLS 18, and can become accessible on the public Internet. It can be very difficult, if not impossible, to prevent the NLS 18 from collecting the location information of the mobile device 11 when using short-range wireless connections, and once the NLS 18 has acquired the location information of the mobile device 11, there is no practical way to prevent dissemination of this information to other parties in an open Internet environment.

Another case for the NLS 18 is in the context of roaming mobile networks. Typically, the mobile user is required to use location-based applications, so the mobile user agrees that the NLS 18 may collect the location information. However, the mobile user cannot trust the NLS 18 in a roamed-to network to not reveal the location information to other parties.

Based on the foregoing discussion of the all-trusted model 10, it can be appreciated that a need exists to overcome the problems that are inherent in the mobile device 11 coming into contact with the NLS 18.

Figure 2:
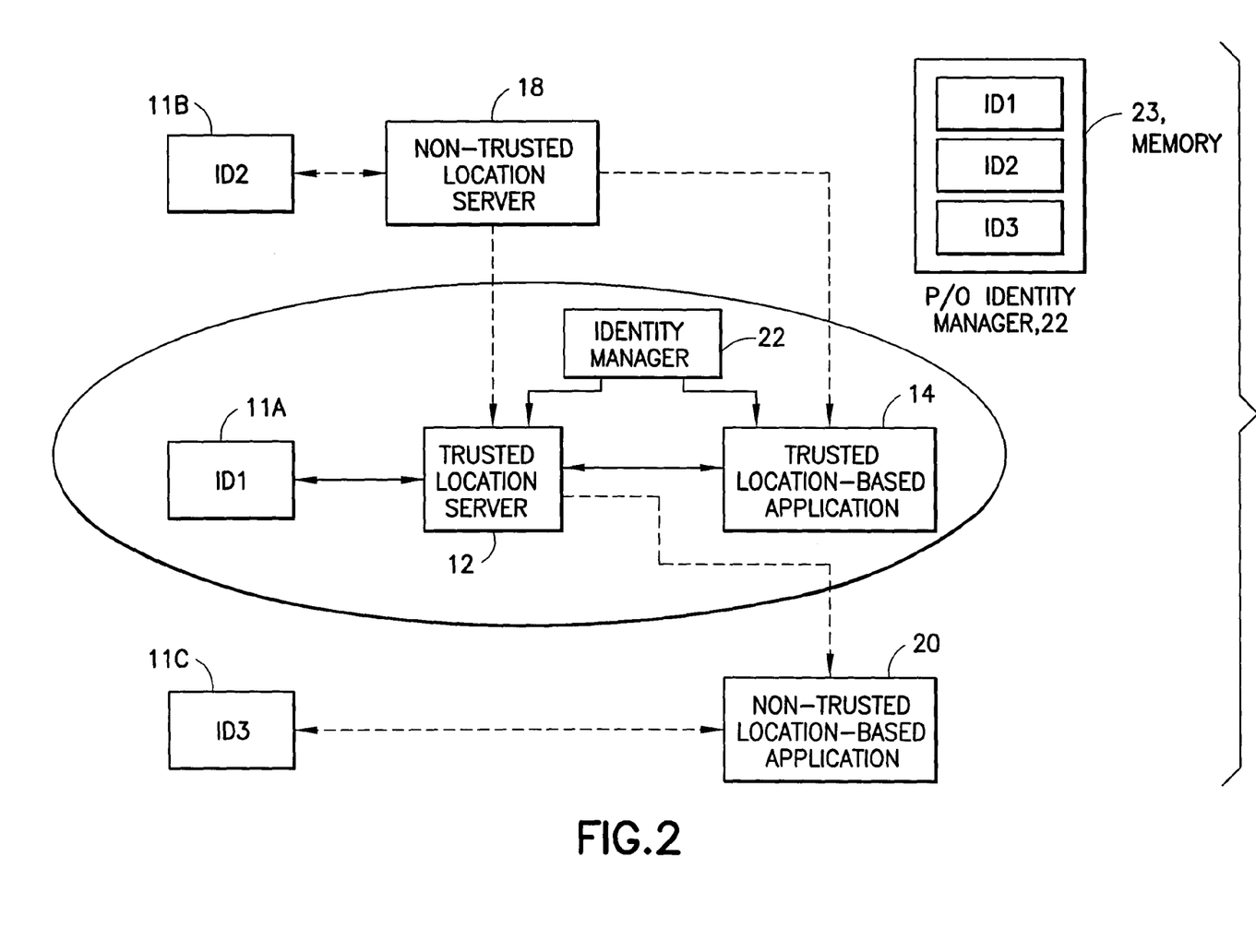
FIG. 2 shows a block diagram that illustrates the location privacy solution based on multiple identities in accordance with this invention.

In order to protect the location privacy of the mobile user in an environment that involves both the TLS 12 and the NLS 18, this invention employs, as is shown in FIG. 2, multiple mobile user identities (ID1, ID2, ID3, or more generally ID1, . . . IDn, where n is an integer greater than one).

As was discussed above, in the existing location service solutions the full identity information of the mobile user is presented to both the TLS 12 and the NLS 18. The identity information, combined with the location information in the NLS 18, may be revealed to other parties without mobile user's consent. Such disclosure may be done by the NLS 18, or by other parties (e.g., by making unauthorized access to data stored in the NLS 18 or the NLA 20). In either case, the location privacy of the mobile user can be compromised.

In the location privacy solution based on multiple identities, in accordance with this invention, the mobile user's actual identity (ID1) is only revealed to the TLS 12, as is illustrated in FIG. 2. A pseudo-identity (ID2), or more generally IDp, is used to represent the mobile user at the NLS 18. The NLS 18 does not have knowledge of the actual identity (ID1) of the mobile user. Another pseudo-identity (ID3) can be used to represent the mobile user to the NLA 20. The association of the pseudo-identities (ID2, ID3) and the actual identity (ID1) is only known to an Identity Manager 22. The Identity Manager 22 can be embodied as a functional block in the mobile device 11 (e.g., in an Identity Module 30 as shown in FIG. 4), in a Wireless Access Network 24 (FIG. 3) or in an identity service provider. For example, the Identity Manager 22 can be a part of the Naming Manager 19 shown in FIG. 1. The Identity Manager 22 is assumed include or be coupled to a memory 23 for securely storing ID1, ID2 and ID3, where ID2 and ID3 can each be considered to be a pseudo-ID of the mobile device 11.

Figure 3:
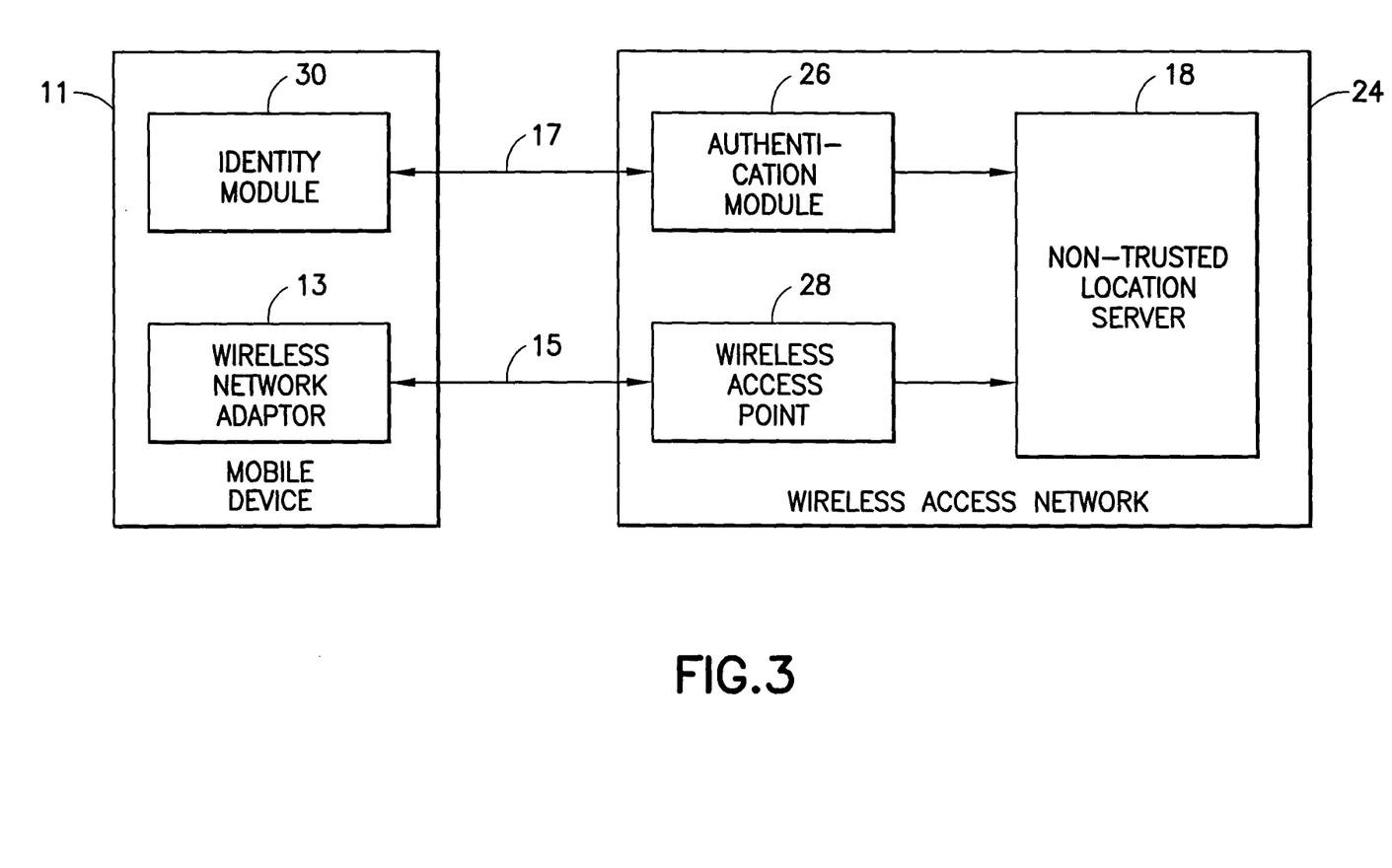
FIG. 3 is a block diagram showing an overview of the system architecture having a Mobile Device and a Wireless Access Network, where the Mobile Device includes an Identity Module and a Wireless Network Adaptor, and where the Wireless Access Network includes an Authentication Module, a Wireless Access Point and a Non-trusted Location Server.
Figure 4:
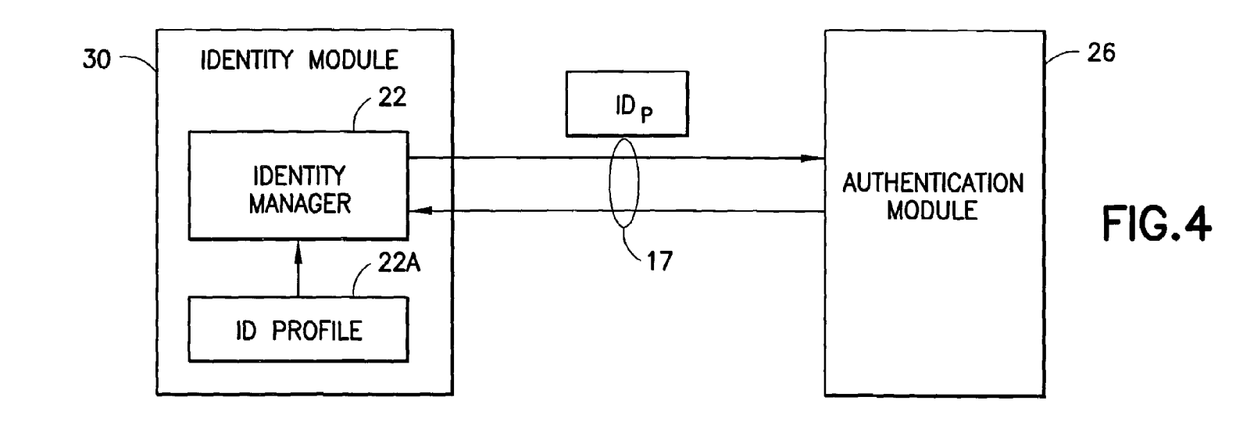
FIG. 4 is a block diagram of an Identity Manager that forms a part of the Identity Module of the Mobile Device of FIG. 3.

The overall system architecture is illustrated in FIG. 3. The architecture includes the mobile device 11 and the Wireless Access Network 24. Within the mobile device 11 there is the Identity Manager 30 and a Wireless Network Adaptor 13. Within the Wireless Access Network 24 is an Authentication Module 26, a Wireless Access Point 28 and the NLS 18. The link 15 between the Wireless Network Adaptor 13 and the Wireless Access Point 28 provides a network connection between the mobile device 11 and the Wireless Access Network 24. The Wireless Access Point 28 receives the mobile device information for accomplishing registration and network/wireless link set-up via the Wireless Network Adaptor 13. The link 17 between the Identity Module 30 and the Authentication Module 26 provides a path for sending the mobile user ID information, where ID1 is sent when connecting with a trusted system, and IDp is sent when connecting with an untrusted system.

The NLS 18 communicates with the Authentication Module 26 and the Wireless Access Point 28, and collects the user identity information (IDp) from the Authentication Module 26 and Wireless Network Adaptor 13 information from the Wireless Access Point 28. The NLS 18 collects and derives location information of the mobile device 11 from the Wireless Access Point 28. The NLS 18 also communicates with the location-based applications 14 and 20, and delivers the identity information (IDp) and location information of the mobile user to these applications. The NLS 18 is assumed to not be obliged to protect the mobile user's privacy, i.e., it cannot be trusted to not reveal the mobile user's identity information and location information without the consent of the mobile user.

Referring to FIG. 4, the Identity Module 30 contains, in this embodiment, the Identity Manager 22 and an ID Profile 22A. The ID Profile 22A contains the full identity information of the mobile user. The Identity Manager 22 communicates with the Authentication Module 26 via the link 17, as was shown in FIG. 3, to provide either ID1, where connecting with a trusted system, or IDp, when connecting with an untrusted server.

In the preferred embodiment of this invention the Identity Module 30 is embodied as a tamper-resistant, secure and trusted module in the mobile device 11, and the data storage and communication within the Identity Module 30 are also secure.

When registering, the Authentication Module 26 sends a request for identification to the Identity Module 30. After receiving the request, the Identity Manager 22 determines that the request is from a non-trusted system, and generates a pseudo-identity (IDp) for the mobile user, or it may use a previously generated and stored IDp. The association of the pseudo-identity and the real identity of the mobile user is only known to the Identity Manager 22. The Identity Manager 22 sends the pseudo-identity to the Authentication Module 26, and the Authentication Module 26 authenticates the mobile user based on the pseudo-identity IDp. The authentication can be performed in the Authentication Module 26, based on an agreement between the mobile user and the Wireless Access Network 24. Alternatively, the Authentication Module 26 may forward the received information back to an Authentication Module in the mobile user's home system for authentication, it being assumed in this case that the home-system Authentication Module will be aware that IDp is associated with ID1. In either case, the mobile user is identified by the pseudo-identity to the (non-trusted) Wireless Access Network 24, and the Authentication Module 26 in the Wireless Access Network 24 has no knowledge of the real identity information of the mobile user. The authentication process, per se, does not form a part of this invention, and any suitable process can be employed.

Figure 5:
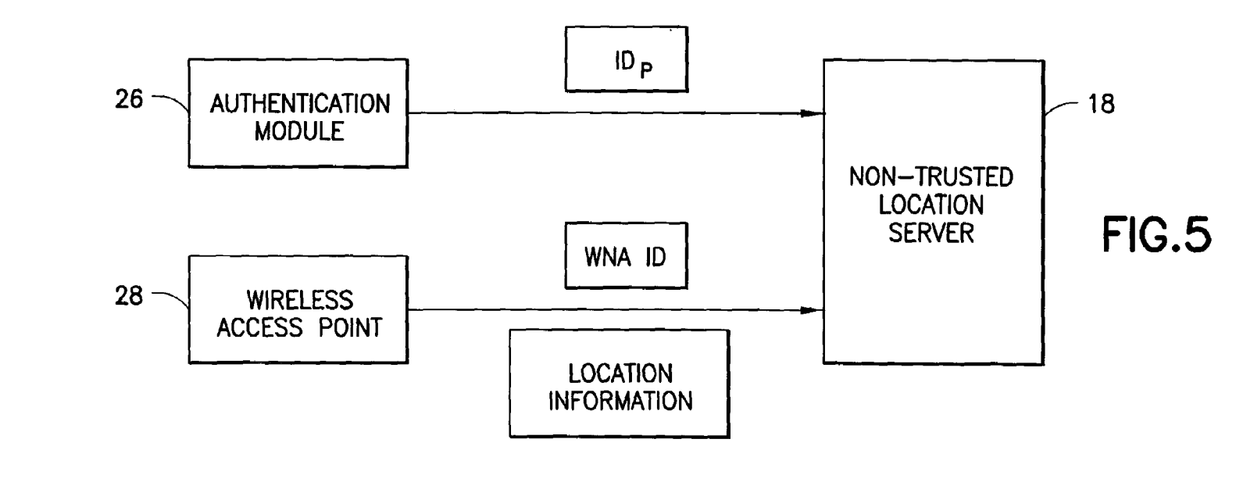
FIG. 5 is a block diagram of the Authentication Module, the Wireless Access Point and the Non-trusted Location Server that forms a part of the Wireless Access Network of FIG. 3.

FIG. 5 shows the connectivity between the Authentication Module 26, the Wireless Access Point 28 and the NLS 18. The NLS 18 communicates with the Authentication Module 26 and the Wireless Access Point 28 to receive the pseudo-identity of the mobile user from the Authentication Module 26 and the Wireless Network Adaptor ID (WNA ID) from the Wireless Access Point 28, and derives location information of the mobile device 11 from the Wireless Access Point 28.

The NLS 18 sends the pseudo-identity and the location information of the mobile user to the location-based applications 14, 20, as needed. Even though the NLS 18 has knowledge of the location information of the mobile device 11, it does not have knowledge of the actual identity (ID1) of the mobile user. Thus, the location privacy of the mobile user is preserved, even when the location information of the mobile device 11 cannot be protected from undesired disclosure, assuming that the knowledge of association of the actual identity of the mobile user and the pseudo-identity is secured.

Figure 6:
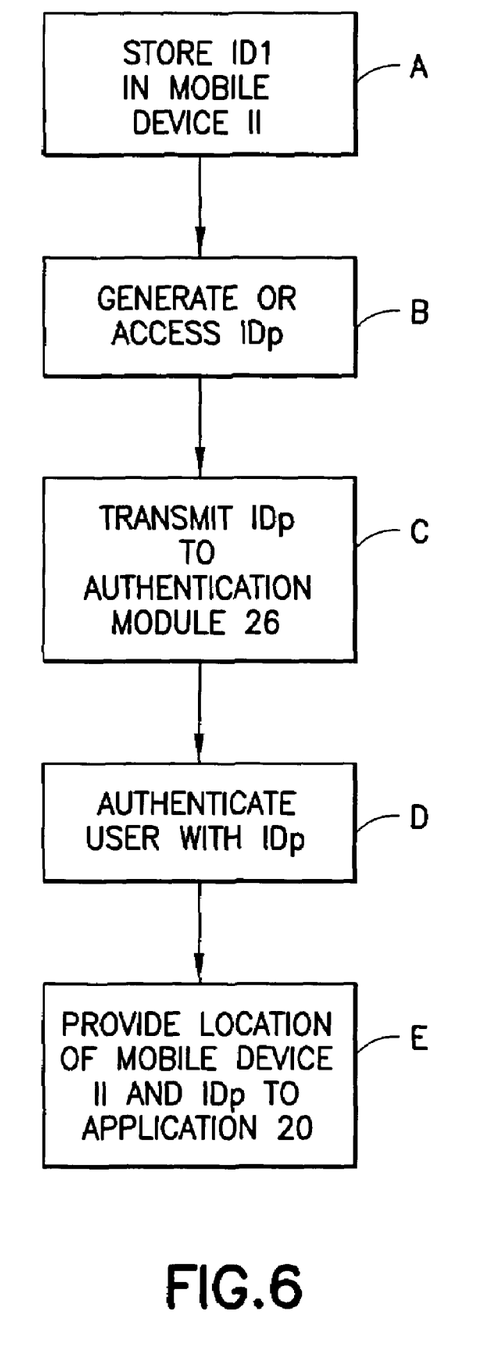
FIG. 6 is a logic flow diagram that illustrates a method for using a location service in a wireless access network.

FIG. 6 is a logic flow diagram that illustrates a method of this invention for using a location service in a wireless access network. The method includes, at block A, storing in a mobile device an actual identification (ID1) of a mobile device user; at block B, when registering with a non-trusted wireless access network, one of generating a pseudo-identification (IDp) or accessing a stored IDp; at block C, transmitting IDp from the mobile device to an Authentication Module 26 of the non-trusted wireless access network; at block D, authenticating the mobile device user based on IDp; and at block E, providing a location of the mobile device and IDp to an (untrusted) application 20.

As should be apparent from the foregoing discussion, in this invention a mobile user's location privacy is assured based on the use of multiple mobile user identities. In this invention the actual (real) identity (ID1) is only revealed to the TLS 12, and a pseudo-identity (ID2) is used to represent the mobile user to the NLS 18. The NLS 18 does not have knowledge of the real identity of the mobile user. The association of the pseudo-identity (ID2) and the real identity (ID1) is known only to the Identity Manager 22.

Through the use of this invention a mobile users can access any number of hot spot wireless access networks with potentially non-trusted location servers, without fearing that their location privacy will be compromised. The use of this invention thus greatly alleviates the mobile user's concern regarding location privacy, and thus encourages the use of location services in wireless access networks.

The use of this invention permits the unrestricted use of location services involving non-trusted location servers. Accordingly, it eases the burden of ensuring data confidentiality on every link of the location service system, including the location server 18, the link from the mobile device 11 to the location server 18 and the link from the location server 18 to the location-based applications 14 and 20, and thus reduces the associated cost.

The use of this invention protects the mobile user's location privacy while still allowing the location information of the mobile device 11 to be known to the NLS 18.

In the location service systems based on the TLS 12, a contract is typically required between the mobile user and each of the wireless access networks 24 that the mobile user can be connected to. The contract binds the location server in the Wireless Access Network 24 to protect mobile user's location information and identity information, e.g. to not reveal such information to third parties without the consent of the mobile user, and to secure the stored information from unauthorized access, etc. Since the use of this invention allows the mobile device 11 to employ the NLS 18, such a contract is not needed. Therefore it facilitates the use of a location service in wireless access networks.

This invention can be used in a number of mobility applications, including but not limited to mobile terminals, wireless access networks including hot spot access networks, and mobile service enablers including mobile personality and location services.

Those skilled in the art should also appreciate that this invention pertains as well to a computer program product containing program code readable by a data processor of the mobile device 11, as well to a computer program product containing program code readable by a data processor located in the wireless access network 24, such as one located at the location server 18.

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. As but some examples, the use of other similar or equivalent location servers, network types and the like may be attempted by those skilled in the art. However, all such and similar modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A method to use a location service in a wireless access network, comprising:

transmitting a pseudo-identification (IDp) from a mobile device to an Authentication Module of the wireless access network;

over a first link of the wireless access network, forwarding the IDp from the Authentication Module to a wireless access network location server;

in the wireless access network location server, associating the IDp with the location of the mobile device; and over a second link of the wireless access network, forwarding the IDp in association with the location of the mobile device from the wireless access network location server to a location-based application.

2. A method as in claim 1, where the IDp is transmitted to an Authentication Module of the wireless access network, further comprising forwarding the IDp from the Authentication Module to the location server.

3. A method as in claim 1, further comprising forwarding the IDp in association with the location of the mobile device to a location-based application.

4. A method as in claim 1, where the IDp is securely stored in the mobile device in conjunction with an actual identification of the mobile device.

5. A method to use a location service in a wireless access network, comprising:

securely storing in a mobile device at least one pseudo-identification (IDp) of a mobile device user in conjunction with an actual identification (ID1) of the mobile device user;

when operating with a trusted wireless access network, transmitting ID1 from the mobile device to the trusted wireless access network and associating ID1 with a location of the mobile device; and when operating with an untrusted wireless access network, transmitting IDp from the mobile device to an Authentication Module coupled to the untrusted wireless access network and associating IDp with a location of the mobile device, forwarding over a first link of the wireless access network the IDp from the Authentication Module to a wireless access network location server of the untrusted wireless access network, the location server associating IDp with the location of the mobile device, and forwarding over a second link of the wireless access network the IDp in association with the location of the mobile device from the location server to a location-based application.

6. A wireless access network comprising in a mobile device a transmitter for transmitting a pseudo-identification (IDp) from the mobile device to an Authentication Module of the wireless access network, and in a wireless access network location server, means for associating the IDp with the location of the mobile device, further comprising means for forwarding over a first link of the wireless access network the IDp from the Authentication Module to the wireless access network location server, and further comprising means for forwarding over a second link of the wireless access network the IDp in association with the location of the mobile device from the location server to a location-based application.

7. A wireless access network as in claim 6, where the IDp is transmitted to the Authentication Module of the wireless access network, further comprising the first link for forwarding the IDp from the Authentication Module to the location server.

8. A wireless access network as in claim 6, further comprising a memory in said mobile device for securely storing the IDp in conjunction with an actual identification of the mobile device.

9. A wireless access network comprising in a mobile device a transmitter for transmitting a pseudo-identification (IDp) from the mobile device to the wireless access network, and in a wireless access network location server, means for associating the IDp with the location of the mobile device, where the IDp is transmitted to an Authentication Module of the wireless access network, the wireless access network further comprising a first link for forwarding the IDp from the Authentication Module to the location server and further comprising a second link for forwarding the IDp in association with the location of the mobile device from the location server to a location-based.

10. A mobile device comprising a wireless network adapter for communication with a wireless access network, further comprising a memory in the mobile device for securely storing at least one pseudo-identification (IDp) of a mobile device user and an actual identification (ID1) of the mobile device user, and an Identity Manager, coupled to the memory, for transmitting ID1 from the mobile device to a trusted wireless access network for associating ID1 with a location of the mobile device, and for transmitting IDp from the mobile device to an Authentication Module coupled to an untrusted wireless access network for associating IDp with a location of the mobile device, the wireless access network further comprising the Authentication Module and a location server, the Authentication Module for forwarding over a first link of the wireless access network the IDp from the Authentication Module to the location server of the untrusted wireless access network, the location server associating the IDp with the location of the mobile device, and the location server for forwarding over a second link of the wireless access network the IDp in association with the location of the mobile device from the location server to a location-based application.

11. A method to use a location service in a wireless access network, comprising:
  storing in a mobile device an actual identification (ID1) of a mobile device user;
  when registering with a non-trusted wireless access network, one of generating a pseudo-identification (IDp) or accessing a stored IDp;
  transmitting IDp from the mobile device to an Authentication Module of the non-trusted wireless access network;
  authenticating the mobile device user based on IDp; and
  providing a location of the mobile device and IDp to an application, wherein providing further comprises:
    over a first link of the wireless access network forwarding the IDp from the Authentication Module to a location server; and
    over a second link of the wireless access network forwarding the IDp in association with the location of the mobile device from the location server to the application.

12. A method as in claim 11, further comprising:
  when registering with a trusted wireless access network, transmitting ID1 from the mobile device to an Authentication Module of the trusted wireless access network;
  authenticating the mobile device user based on ID1; and
  providing a location of the mobile device and ID1 to an application.

13. A mobile device operable for using a location service in a wireless access network, comprising:
  means for authenticating the mobile device comprising means for transmitting a pseudo-identification (IDp) from the mobile device to a location server of the wireless access network for associating the IDp with a location of the mobile device, where the IDp is transmitted to an Authentication Module of the wireless access network, where the wireless access network further comprises means for forwarding over a first link of the wireless access network the IDp from the Authentication Module to the location server and further comprises means for forwarding over a second link of the wireless access network the IDp in association with the location of the mobile device from the location server to a mobile application; and
  means, responsive to the mobile device being authenticated, for executing the mobile application in cooperation with an application server.

14. A mobile device as in claim 13, where the means for forwarding the IDp comprises the Authentication Module.

15. A mobile device as in claim 13, where the application server is a mobile device location-based application server, and where the means for forwarding the IDp forwards the IDp in association with the location of the mobile device to the location-based application server.

16. A mobile device as in claim 13, where the IDp is securely stored in a memory means of the mobile device in conjunction with an actual identification of the mobile device.

17. A computer medium program product comprising program code readable by at least one data processor for using a location service in a wireless access network, comprising:
  a program code segment for authenticating the mobile device comprising computer program code for transmitting a pseudo-identification (IDp) from the mobile device to a location server of the wireless access network for associating the IDp with a location of the mobile device, where the program code for transmitting transmits the IDp to an Authentication Module of the wireless access network, and forwards over a first link of the wireless access network the IDp from the Authentication Module to the location server;
  a program code segment for forwarding over a second link of the wireless access network the IDp in association with the location of the mobile device from the location server to a mobile application; and
  a program code segment, responsive to the mobile device being authenticated for executing the mobile application in cooperation with a mobile device location-based application server.

18. A computer medium program product comprising program code readable by at least one data processor, comprising program code operable for reading a memory in the mobile device, the memory securely storing at least one pseudo-identification (IDp) of a mobile device user and an actual identification (ID1) of the mobile device user, said program code implementing an Identity Manager function for transmitting ID1 from the mobile device to a trusted wireless access network for associating ID1 with a location of the mobile device, and for transmitting IDp from the mobile device to an untrusted wireless access network for associating IDp with a location of the mobile device, the program code operable for transmitting IDp to an Authentication Module coupled to the untrusted wireless access network, the program code also operable for forwarding over a first link of the wireless access network the IDp from the Authentication Module to a location server and operable for forwarding over a second link of the untrusted wireless access network the IDp in association with the location of the mobile device from the location server to a location-based application.

19. A computer medium program product comprising program code readable by at least one data processor comprising part of a wireless network location server coupled to a mobile device through a wireless access network, comprising program code, responsive to a receipt of a pseudo-identification (IDp) from the mobile device, for associating the IDp with a determined location of the mobile device, where the IDp is received at the wireless network location server from an Authentication Module coupled to the wireless network location server and to the mobile device, the program code also for forwarding over a first link of the wireless access network the IDp from the Authentication Module to the wireless network location server and for forwarding over a second link of the wireless access network the IDp in association with the determined location of the mobile device from the wireless network location server to a location-based application.

20. A computer medium program product as in claim 19, where the IDp is received by the program code via the Authentication Module.

* * * * *

UNITED STATES PATENT AND TRADEMARK OFFICE
CERTIFICATE OF CORRECTION

| | |
|---|---|
| PATENT NO. | : 7,088,989 B2 |
| APPLICATION NO. | : 10/431283 |
| DATED | : August 8, 2006 |
| INVENTOR(S) | : Yile Guo |

Page 1 of 1

It is certified that error appears in the above-identified patent and that said Letters Patent is hereby corrected as shown below:

IN THE CLAIMS:

Claim 9, Column 9, line 19 after "location-based" insert --application--.

Signed and Sealed this

Fourteenth Day of November, 2006

JON W. DUDAS
*Director of the United States Patent and Trademark Office*